Sept. 4, 1945. Z. HOLLOS 2,384,092
MECHANICAL DRIVE MECHANISM FOR VEHICLES
Filed July 27, 1943 4 Sheets-Sheet 1
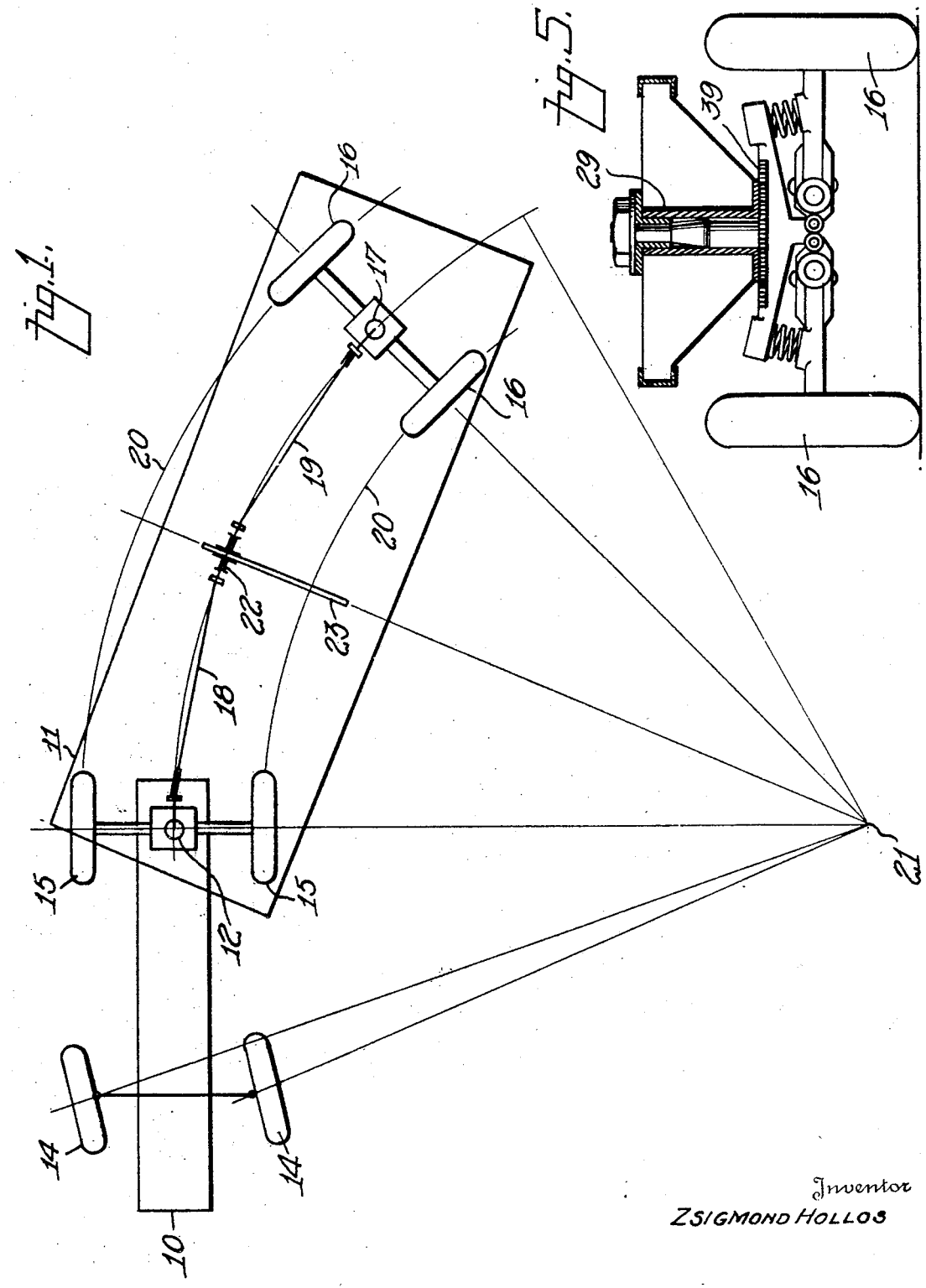
Inventor
ZSIGMOND HOLLOS
By Young, Emery & Thompson
Attorneys

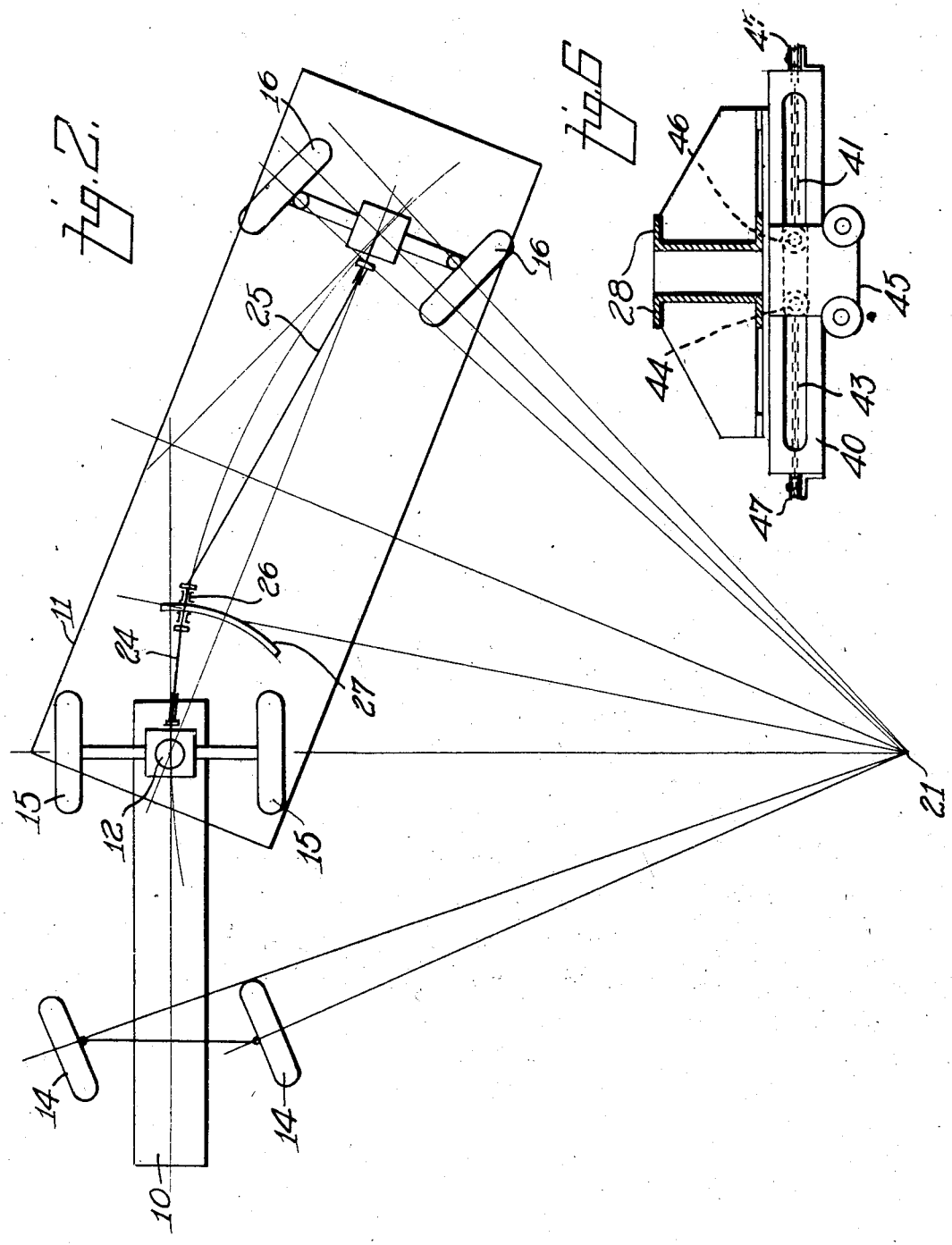

Sept. 4, 1945.   Z. HOLLOS   2,384,092
MECHANICAL DRIVE MECHANISM FOR VEHICLES
Filed July 27, 1943    4 Sheets-Sheet 3
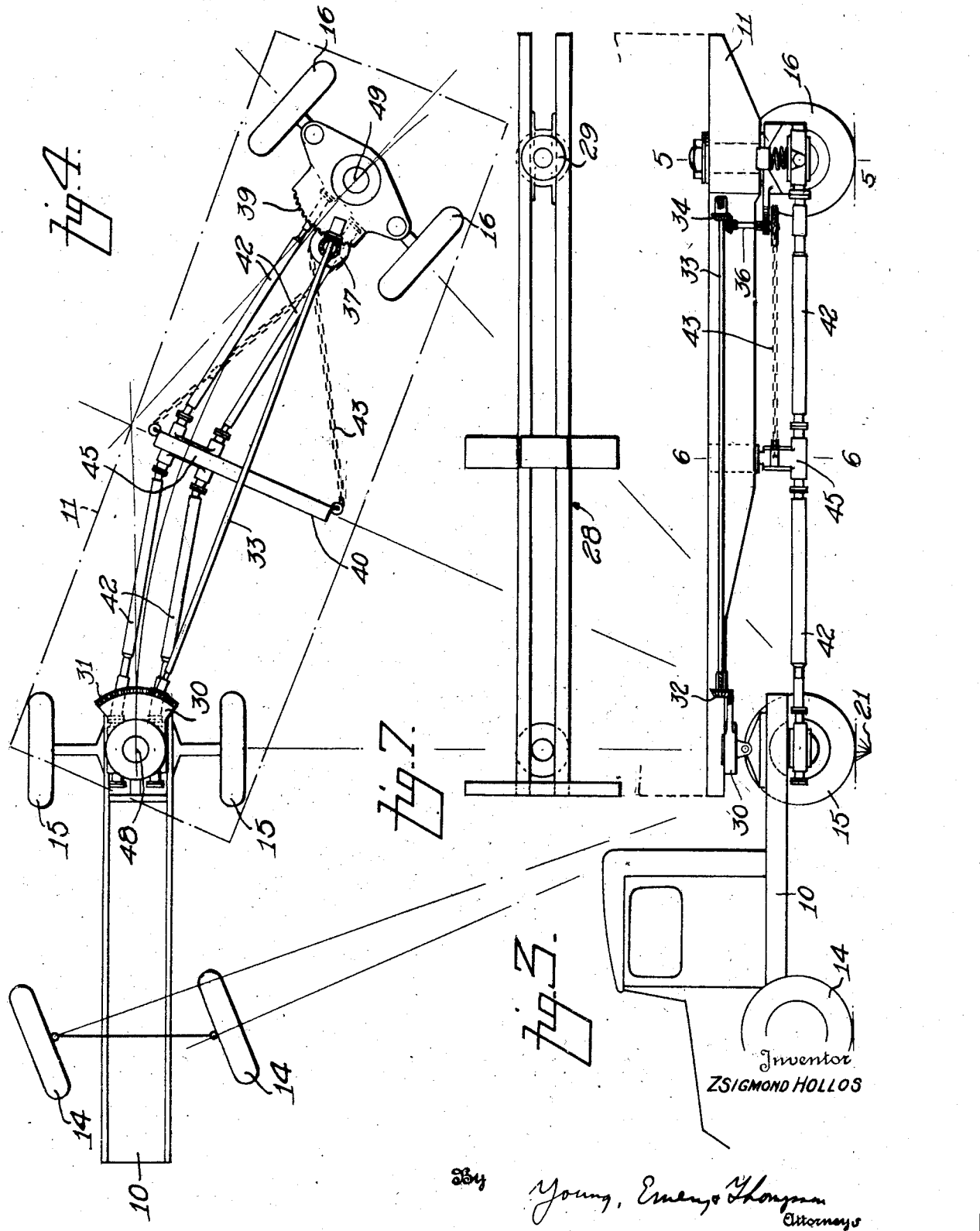
Inventor
ZSIGMOND HOLLOS
By Young, Emery & Thompson
Attorneys Sept. 4, 1945. Z. HOLLOS 2,384,092
MECHANICAL DRIVE MECHANISM FOR VEHICLES
Filed July 27, 1943 4 Sheets-Sheet 4
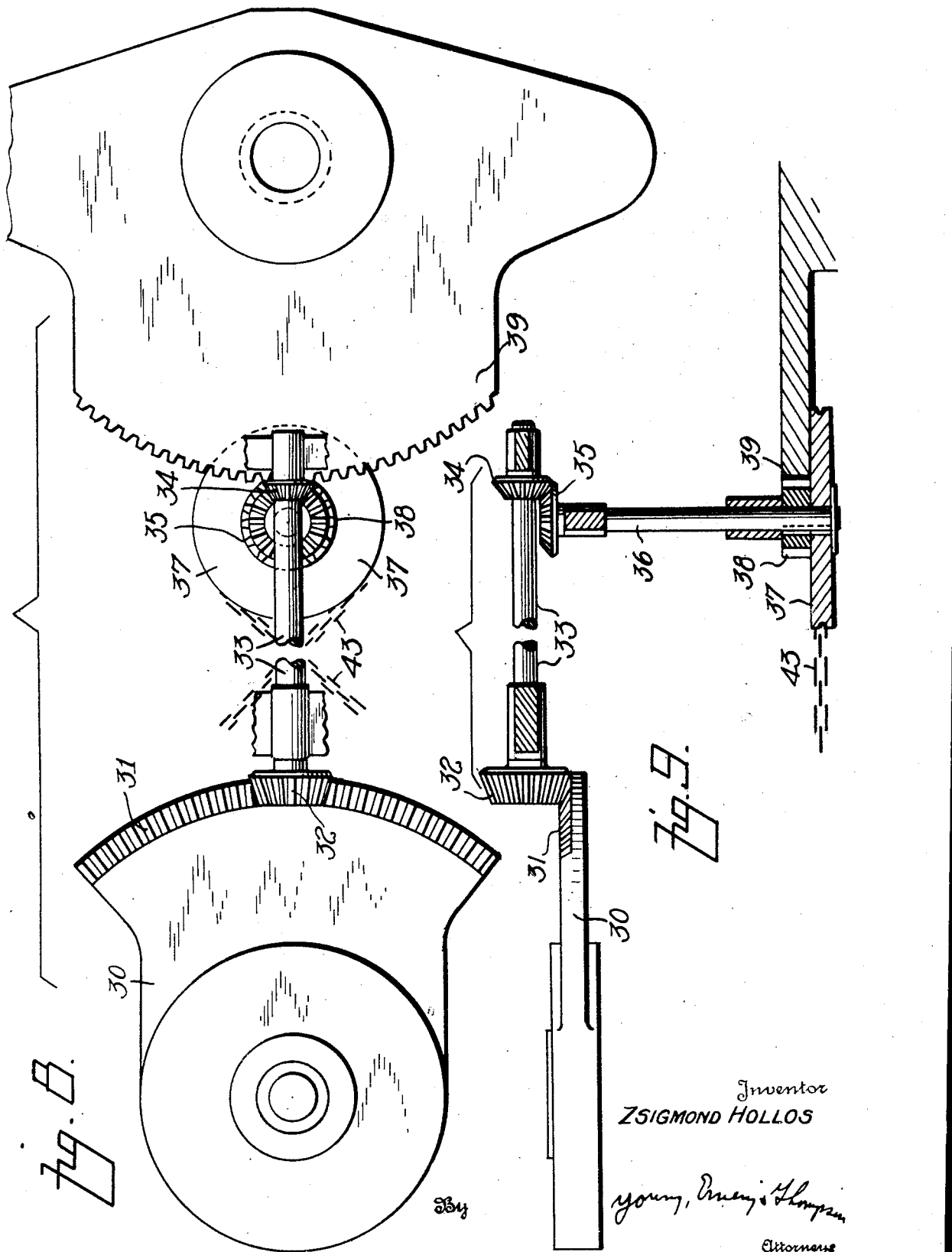
Inventor
ZSIGMOND HOLLOS Patented Sept. 4, 1945

2,384,092

UNITED STATES PATENT OFFICE 2,384,092

MECHANICAL DRIVE MECHANISM FOR VEHICLES

Zsigmond Hollos, New York, N. Y.

Application July 27, 1943, Serial No. 496,333

5 Claims. (Cl. 180—14)

The invention relates to a mechanical drive mechanism for vehicles of all types including both commercial and military vehicles and guns having coupled axles for the wheels or endless tracks.

The drive takes place directly from axle to axle or driving shaft to driving shaft having jointed members without the interposition of gear wheels on the chassis. The jointed shafts which are arranged in the longitudinal axis of the vehicle or parallel thereto are compelled to perform lateral angular displacements when the vehicle is traversing a curve due to the steering shift of the wheels, these displacements being of such magnitude that excessive power losses result. According to the present invention these angular displacements are made smaller by automatic lateral extension of the joint shafts whereby the power losses are reduced to a minimum.

It is therefore an object of the invention to provide means to mechanically couple the two sets of wheels, front and back of a trailer vehicle so that when the vehicle traverses a curve both sets of wheels will be adjusted into the curvature traversed, at the same time automatically and mechanically adjusting the driving shafts for the wheels to maintain the driving power as much as possible. A further object resides in automatically and mechanically adjusting the driving shafts of the vehicle laterally at its approximate mid point when the vehicle is traversing a curve.

Further objects will be apparent from the following description when considered in connection with the accompanying drawings in which:

Figure 1 is a diagrammatic plan view of a vehicle with trailer showing one central longitudinal driving shaft, Fig. 2 is a similar view showing a modified structure, Fig. 3 is a side elevation of a vehicle having two sets of driving shafts, Fig. 4 is a top plan view of the vehicle of Fig. 3, Fig. 5 is a cross section taken on line 5—5 of Fig. 3, Fig. 6 is a cross section taken on line 6—6 of Fig. 3, Fig. 7 is a plan view of a detail of the frame construction, Fig. 8 is a top plan view of the wheel and shaft adjusting mechanism on enlarged scale, and Fig. 9 is a side elevation of the mechanism of Fig. 8, partly in section.

Referring now to Fig. 1, it will be seen that a tractor 10 is connected to a semi-trailer 11 by any suitable means such as a draw pin 12. The front wheels 14 of the tractor are steering wheels but the rear wheels 15 thereof are non-steering wheels. Rear wheels 16 of the trailer 11 are steering wheels and are rotatable around a center pin 17 secured to the trailer. The wheels 15 are driven by a motor, not shown, and wheels 16 are driven by means of driving shafts 18 and 19.

When traversing a curve, such as indicated by lines 20 having a center point 21, the center transmission members indicated generally at 22 slide on a guide bar 23 secured on the vehicle 11. As seen from Fig. 1, all the radii of the wheels 14, 15 and 16 have a common center at 21.

In Fig. 2, the driving shafts for axles and wheels 15 and 16 are provided as one short shaft 24 and one long shaft 25 having the transmission members or angle compensator 26 slidably mounted on a curved bar 27. As shown in Fig. 2, the vehicle is traversing a curve having its center at 21 but when the vehicle is traversing a straight path the members 26 will slide to a position mid-way between the ends of the bar 27, the shafts 24 and 25 being provided with suitable telescoping parts to permit elongation.

Figs. 3 and 4 illustrate two sets of drive shafts, one set for each of the right and left groups of wheels. The trailer 11 is provided with a frame 28 having a bearing member 29 for the rear wheels 16. The wheels 15 are provided with a gear-rack segment 30 secured thereto and having a gear rack 31, Fig. 8. The gear rack 31 meshes with a pinion 32 securely mounted on one end of a horizontal shaft 33, said shaft having a bevel gear or pinion 34 securely mounted on the other end. The bevel gear 34 meshes with a bevel gear 35 securely mounted to rotate on and with a short vertical shaft 36 at one end thereof, a sprocket wheel or pulley 37 and a spur gear 38 being securely mounted on the other end of the shaft. A gear segment 39 meshes with the pinion 38 and this segment is secured to the rear wheels 16 pivoting as a unit therewith in the bearing member 39.

A guide bar 40, Figs. 4 and 6, is secured to the underside of the frame 28 and is provided with a slot 41 which slidably guides a block support or bearing 45 for the dual drive shafts 42. A cable or chain 43 is connected at one end 44 to the block 45 and at the other end 46 to the same block but at the opposite side. This chain 43 passes around guide pulleys 47, one on each end of the bar 40 and then crosses to and around the wheel 37.

The operation of the invention is obvious from the foregoing description. As shown in Fig. 4, the vehicle is traversing a curve wherein the segment 30 has rotated or pivoted around a vertical axis 48 which has imparted a circumferential movement of the gear rack 31. This causes rotation of gear 32, shaft 33, gear 34, gear 35, shaft 36 and finally gear 38, the latter rotating the segment 39 together with the wheels 16 around a vertical axis 49. Pulley 37 rotates with gear 38 causing chain 43 to adjust or slide the block 45 relative to its guide bar 40 and the trailer 11. In this manner the jointed shafts 42 are shifted laterally from the longitudinal axis of the vehicle, the displacements of the shafts being of such magnitude that power losses are reduced to a minimum.

I claim as my invention:

1. A vehicle comprising a tractor having a pair of front steering wheels and a pair of rear non-steering wheels, a trailer pivotally mounted at the front end on the rear part of the tractor and having a pair of steering wheels on the rear end thereof, a driving transmission shaft mechanism extending from the rear non-steering wheels for driving the rear steering wheels of the trailer, said shaft mechanism having means to provide for lateral adjustment thereof, means connected to the tractor for operating the steering wheels of the trailer when the vehicle traverses a curve, and means on the trailer for laterally shifting the transmission shaft mechanism operable by the first-mentioned means to shift the transmission shaft mechanism simultaneously with the shifting of the steering wheels of the trailer.

2. A vehicle according to claim 1, in which the means for shifting the transmission shaft mechanism includes a guide bar mounted on the trailer and a slide carrying the shaft mechanism, said slide mounted to shift on the guide bar.

3. A vehicle according to claim 1, in which the trailer is pivotally connected to the tractor directly above the pair of non-steering wheels.

4. A vehicle comprising a tractor having a pair of front steering wheels and a pair of rear non-steering wheels, a trailer pivotally mounted at the front end on the rear part of the tractor and having a pair of steering wheels on the rear end thereof, a driving transmission shaft mechanism extending from the rear non-steering wheels for driving the rear steering wheels of the trailer, means intermediate the ends of the transmission shaft mechanism for supporting the shaft mechanism and permitting sliding lateral adjustment thereof, and means interconnected with the rear non-rotating wheels of the tractor, the rear wheels of the trailer and the first-mentioned means to operate the steering wheels of the trailer and adjust the transmission shaft mechanism laterally when the vehicle traverses a curve.

5. A vehicle according to claim 1, in which the transmission shaft mechanism consists of a pair of laterally spaced shaft mechanisms, each for driving one of the rear steering wheels, and a coupling provided between said pair of shaft mechanisms whereby the shifting means on the trailer is effective to shift both mechanisms laterally and simultaneously with the shifting of the steering wheels of the trailer.

ZSIGMOND HOLLOS.